United States Patent Office 3,790,518
Patented Feb. 5, 1974

3,790,518
CEMENT COMPOSITIONS
Herbert Jackson Shearing, Manchester, England, assignor to Imperial Chemical Industries Limited, London, England
No Drawing. Filed Mar. 11, 1971, Ser. No. 123,418
Claims priority, application Great Britain, Mar. 18, 1970, 13,039/70
Int. Cl. C08g 51/24
U.S. Cl. 260—25
8 Claims

ABSTRACT OF THE DISCLOSURE

Cement compositions comprising a hydraulic cement, a silica filler, water, an organic polyisocyanate and the reaction product of castor oil with a hard resin derived from rosin. These compositions set rapidly and provide strong, durable flooring surfaces having good flexibility.

This invention relates to an improvement in or modification of the invention described in our specification No. 1,192,864.

Specification No. 1,192,864 describes and claims compositions having as essential ingredients a hydraulic cement, a silica filler, water and an organic compound containing a plurality of isocyanate groups. These compositions may also contain an isocyanate-reactive compound which may be a polyhydric alcohol, an aminoalcohol, a polyamine, a polyester or a polyesteramide, and preferably a dihydric or trihydric polyether having an equivalent weight of from 100 to 1500.

We have now found that cement compositions having improved flexibility are obtained when as isocyanate-reactive compound there is used the reaction product of castor oil with a hard resin.

According to the present invention there are provided cement compositions having as essential ingredients a hydraulic cement, a silica filler, water, an organic polyisocyanate and the reaction product of castor oil with a hard resin as hereinafter defined.

By the reaction product of castor oil with a hard resin we mean a product which is obtained by heating castor oil with a resin which is a rosinate of a metal selected from Group IIa of the Periodic Table or a condensation product of rosin with (i) at least one polyhydric alcohol or (ii) at least one polyhydric alcohol and at least one optionally substituted phenol/formaldehyde resol resin, or (iii) at least one polyhydric alcohol and at least one $\alpha,\beta$-unsaturated dicarboxylic acid or the anhydride thereof.

As examples of rosinates of metals selected from Group IIa of the Periodic Table which may be reacted with castor oil there may be mentioned calcium rosinate and barium rosinate.

As examples of polyhydric alcohols which may be condensed with rosin, either alone or together with an optionally substituted phenol/formaldehyde resol resin or an $\alpha,\beta$-unsaturated dicarboxylic acid or the anhydride thereof, there may be mentioned glycerol, pentaerythritol, trimethylopropane and sorbitol.

By resol resins we mean the alkaline catalyzed reaction products of one mole of a phenol with at least one mole of formaldehyde. The most commonly used and preferred phenol for use in the preparation of resol resins is phenol itself, but other phenols and alkyl substituted phenols, for example, p-butylphenol, p-octylphenol and p-alkyl substituted phenols generally may also be used.

As examples of $\alpha,\beta$-unsaturated dicarboxylic acids and anhydrides thereof which may be condensed with rosin together with a polyhydric alcohol as defined above there may be mentioned maleic acid, fumaric acid and maleic anhydride.

The reaction of the castor oil with the resin as defined above is carried out at a high temperature, for example, at 235–240° C. for a time of from ½ to 2 hours.

The castor oil and resin may be used in the proportion of from 99:1 to 1:99 parts by weight, the preferred range being from 95:5 to 20:80 parts by weight.

The term "hydraulic cement" is used in its usual sense to denote the class of structural materials which are applied in admixture with water and thereafter harden or set as a result of physical or chemical changes which consume the water present. As well as portland cement, it includes:

(1) Rapid hardening cements, as characterized by those with high alumina contents.
(2) Low-heat cements as characterized by high percentages of dicalcium silicate and tetracalcium alumino ferrite and low percentages of tricalcium silicate and tricalcium aluminate.
(3) Suphate resisting cements as characterized by unusually high percentages of tricalcium silicate and dicalcium silicate and unusually low percentages of tricalcium aluminate and tetracalcium alumino ferrite.
(4) Portland blast-furnace cement as characterized by a mixture of portland cement clinker and granulated slag.
(5) Masonry cements as characterized by mixtures of portland cement and one or more of the following: hydrated lime, granulated slag, pulverized limestone, colloidal clay, diatomaceous earth or other finely divided forms of silica, calcium stearate and paraffin.
(6) Natural cements as characterized by material obtained from deposits in the Lehigh Valley, U.S.A.
(7) Lime cements as characterized by oxide of calcium in its pure or impure forms and whether containing or not some argillaceous material.
(8) Selenitic cement as characterized by the addition of 5–10% of plaster of Paris to lime.
(9) Pozzolanic cement as characterized by the mixture of pozzolana, trass kieselguhr, pumice, tufa, Santorin earth or granulated slag with lime mortar.
(10) Calcium sulphate cements as characterized by those depending on the hydration of calcium sulphate and includes plaster of Paris, Keene's cement and Parian cement.

As silica fillers which may be used, there may be mentioned sands and silicas of low clay content, preferably washed and having a particle size mainly within the range 1½"–200 B.S. sieve size (0.05–0.0076 cm.), although sizes outside these limits may be used for special applications.

As organic polyisocyanates which may be used, there may be mentioned tolylene diisocyanate and diphenyl methane diisocyanate, also uretedione or isocyanurate polymers of these, and isocyanate-ended polyurethanes obtained by reacting an excess of an organic diisocyanate with a polyfunctional isocyanate-reactive compound such as a glycol or higher polyhydric alcohol, amino alcohol or polyamine, a polyester, polyesteramide or polyether. There may also be used the polyisocyanate composition known as "crude MDI" which comprises a mixture of diphenylmethane diisocyanate with methylene-linked polyphenyl polyisocyanates of higher functionality and which is obtained by phosgenation of the mixed polyamines prepared by condensing formaldehyde with aniline in the presence of hydrochloric acid.

The compositions of the invention may also contain solvents and thinners, for example, esters, ketones and hydrocarbons. Specific solvents which may be used include methyl ethyl ketone, methyl isobutyl ketone, 4-methyl-4-methoxypentane-2-one, ethyl acetate, butyl acetate, ethoxyethyl acetate, cyclohexanone, toluene and xylene.

Part of the reaction product of castor oil and a hard resin as hereinbefore defined which is used in the compositions may be replaced by any of those isocyanate-reactive compounds known from specification No. 1,192,864 and mentioned above as suitable additives. Up to 95% of the castor oil/hard resin reaction product may be so replaced. The proportions of the different ingredients used in the present composition may be varied widely. Thus per 100 parts by weight of cement there may be used from 10 to 10,000 parts by weight of silica filler, from 10 to 75 parts by weight of water, from 5 to 5000 parts by weight of resin-forming components, defined as organic polyisocyanate plus castor oil/hard resin reaction product and any other isocyanate-reactive organic compound which may be present, and from 0 to 200 parts by weight of solvents. Preferred quantities are from 50–8000 parts of filler, 20–50 parts of water, 10–4000 parts of urethane resin and 0–100 parts of solvent.

The compositions of the invention, according to their fluidity, may be used as self-levelling or trowelling flooring finishes and are superior to ordinary cement floorings or other known resin-bonded cement flooring compositions by virtue of their rate of setting. The compositions make it possible to obtain floors which are sufficiently stable to walk upon within 1–2 hours of laying and to withstand the falling weight impact test of DEF 1083, method 17, after only 24 hours curing.

The invention is illustrated by the following example in which parts and percentages are by weight:

EXAMPLE 100 parts of portland cement, 100 parts of sand of 30–200 B.S. sieve size (0.05–0.0076 cm.), 25 parts of water and 100 parts of a castor oil/hard resin reaction product (prepared as described below) are mixed together until an even mixture is obtained. 50 parts of crude MDI (containing approximately 50% of diphenylmethane-4,4'-diisocyanate, the remainder being methylene-linked polyphenyl polyisocyanates of higher functionality) are then added to the previously prepared mixture and mixing is continued to give a uniform product. The composition so obtained is quick-setting and when spread out in a layer ½ inch (1.27 cm.) thick is firm enough to walk on in about 1 hour.

The castor oil/hard resin reaction product used in this example is prepared by the following method:

320 parts of 1st pressings castor oil are heated together with 80 parts of an esterified rosin-modified phenol formaldehyde resol resn at 240° C. for 45 minutes. The latter ingredient is the glycerol ester of the product from the reaction between rosin and a diphenylolpropane-formaldehyde resol resin.

What I claim is:

1. A cement composition having as essential ingredients a hydraulic cement, a silica filler, water, an organic polyisocyanate and the reaction product obtained by heating castor oil with a resin which is a rosinate of a metal selected from Group IIa of the Periodic Table or a condensate product of rosin with (i) at least one polyhydric alcohol or (ii) at least one polyhydric alcohol and at least one optionally substituted phenol/formaldehyde resol resin or (iii) at least one polyhydric alcohol and at least one $\alpha,\beta$-unsaturated dicarboxylic acid or the anhydride thereof, said composition containing, by weight, 10–10,000 parts of silica filler, 10–75 parts of water and 5–5000 parts of the polyisocyanate and said reaction product per 100 parts of hydraulic cement, the polyisocyanate being used in excess with respect to said reaction product for reaction with the water.

2. A cement composition as claimed in claim 1 wherein the hydraulic cement is selected from portland cement, rapid hardening cements, low-heat cements, sulphate resisting cements, portland blast-furnace cement, masonry cements, natural cements, lime cements, selenitic cement, pozzolanic cement and calcium sulphate cements.

3. A cement composition as claimed in claim 1 wherein the silica filler has a particle size within the range 1½ inches to 200 B.S. sieve size.

4. A cement composition as claimed in claim 1 which also contain other isocyanate-reactive compounds.

5. A cement composition as claimed in claim 4 wherein the isocyanate-reactive compound is a dihydric or trihydric polyether having an equivalent weight of from 100 to 1500.

6. A cement composition as claimed in claim 1 which also contains an inert solvent or thinner.

7. A cement composition as claimed in claim 1 which also contains, by weight, 50–8000 parts of silica filler, 20–50 parts of water, 10–4000 parts of resin-forming components and 0–100 parts of solvent per 100 parts of hydraulic cement.

8. Flooring surfaces whenever obtained from a cement composition as claimed in claim 1.

References Cited
UNITED STATES PATENTS

| | | | |
|---|---|---|---|
| 3,252,924 | 5/1966 | Merten | 260—24 |
| 3,211,675 | 10/1965 | Johnson | 260—2.5 AK |
| 3,354,099 | 11/1967 | Stegeman | 260—2.5 AK |
| 2,902,388 | 9/1959 | Szukiewicz | 106—90 |

MORRIS LIEBMAN, Primary Examiner

P. R. MICHL, Assistant Examiner

U.S. Cl. X.R.

260—18 TN, 19 R, 24, 29.2 TN